United States Patent [19]
Kimura

[11] Patent Number: 5,481,394
[45] Date of Patent: Jan. 2, 1996

[54] VARIABLE-APEX PRISM CONTROLLER

[75] Inventor: Kenichi Kimura, Kawasaki, Japan

[73] Assignee: Canon Kabushiki Kaisha, Tokyo, Japan

[21] Appl. No.: 112,319

[22] Filed: Aug. 27, 1993

[30] Foreign Application Priority Data

Aug. 31, 1992 [JP] Japan .................... 4-255472

[51] Int. Cl.⁶ .................... G02B 27/64
[52] U.S. Cl. .................... 359/234; 359/554; 359/557; 359/198; 359/197; 359/831
[58] Field of Search .................... 359/557, 832, 359/198, 234, 554, 197, 831

[56] References Cited

U.S. PATENT DOCUMENTS

| | | | |
|---|---|---|---|
| 5,210,635 | 5/1993 | Nagata et al. | 359/198 |
| 5,311,367 | 5/1994 | Ohki et al. | 359/832 |
| 5,315,435 | 5/1994 | Horiuchi | 359/832 |
| 5,331,467 | 7/1994 | Sato | 359/557 |

FOREIGN PATENT DOCUMENTS

| | | |
|---|---|---|
| 3-94215 | 4/1991 | Japan . |
| 3-94214 | 4/1991 | Japan . |
| 4-21832 | 1/1992 | Japan . |
| 5-134285 | 5/1993 | Japan . |
| 5-181094 | 7/1993 | Japan . |

*Primary Examiner*—Viet Q. Nguyen
*Attorney, Agent, or Firm*—Fitzpatrick, Cella, Harper & Scinto

[57] ABSTRACT

A variable-apex prism controller which controls a variable-apex prism composed of two transparent optical members and an optically transparent substance sealed in the space defined between the two optical members, wherein the two optical members of the variable-apex prism are rotated by rotating devices around rotation axes orthogonal to each other in accordance with information from a movement detecting device. When correcting any blur by deflecting a transmitted light flux, the maximum blur correction angle $\epsilon_{max}$ obtained along the directions of the rotation axes of the optical members is set beforehand. The rotation amounts of the two optical members are restricted in such a way that the maximum blur correction angle for any blur occurring along a direction different from the rotation axes is substantially the same as the above-mentioned maximum correction angle $\epsilon_{max}$.

18 Claims, 9 Drawing Sheets

$$\tan\theta_1' = \frac{r\sin\phi \cdot \tan\theta p}{r}$$
$$= \sin\phi \cdot \tan\theta p$$

$$\tan\theta_2' = \frac{r\cos\phi \cdot \tan\theta y}{r}$$
$$= \cos\phi \cdot \tan\theta y$$

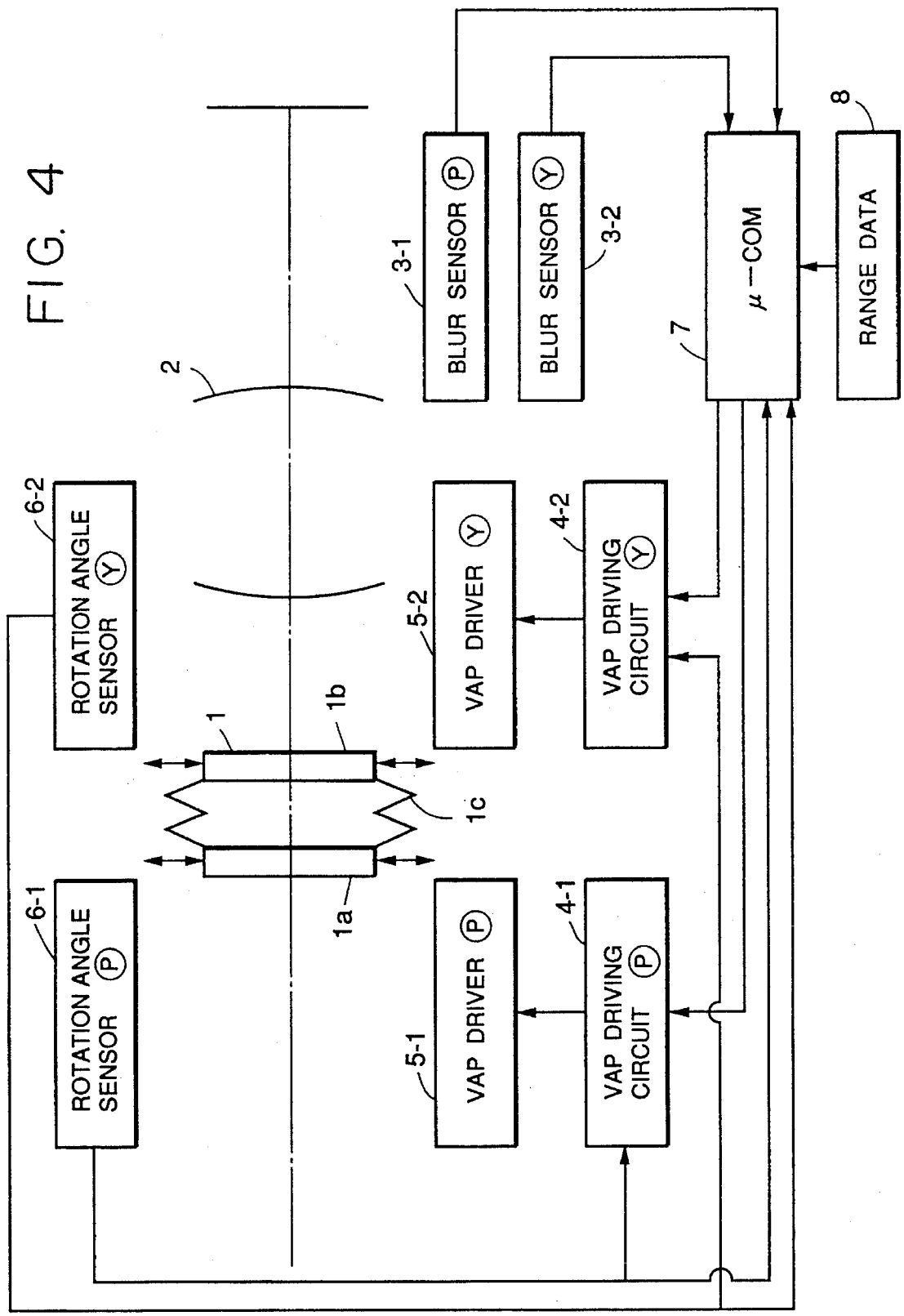

FIG. 7(A) PRIOR ART
FIG. 7(B) PRIOR ART
FIG. 7(C) PRIOR ART
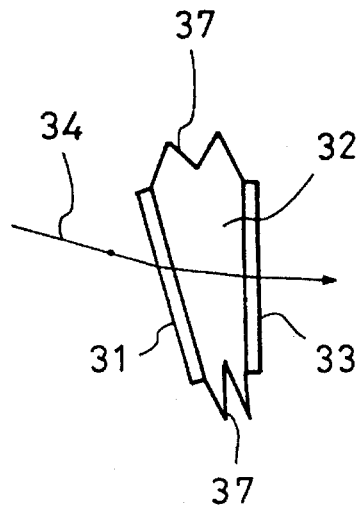
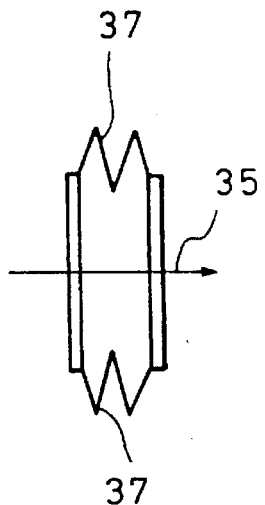
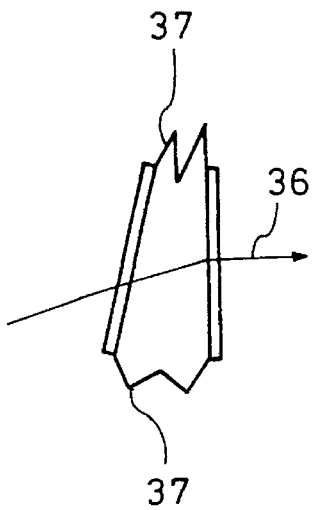
FIG. 8(A) PRIOR ART
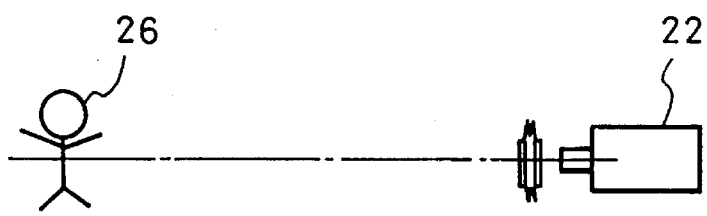
FIG. 8(B) PRIOR ART
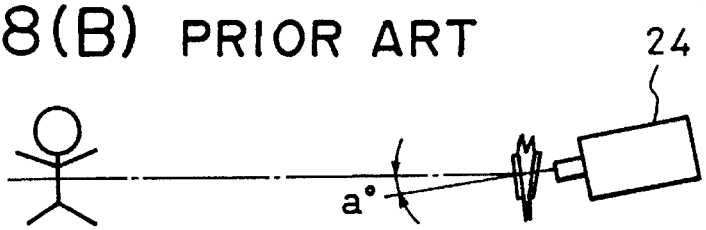

VARIABLE-APEX PRISM CONTROLLER

BACKGROUND OF THE INVENTION

1. Field of the Invention

The present invention relates to an anti-vibration device having a variable-apex prism and, in particular, to an anti-vibration device having a variable-apex prism for use in optical apparatuses (such as video or still cameras) and capable of correcting image blur due to vibrations, etc. by arbitrarily changing the propagation direction of a transmitted light flux.

2. Description of the Related Art

Recently, progress has been made in automatization of photographing operations with camera apparatuses, such as still and video cameras; and various means for realizing automatized functions, for example, automatic exposure control means and automatic focusing means, have been put into practical use.

As one of such means, a blur correction means for mitigating undesirable blur in a picture (a so-called image blur) due to various causes has been devised and is being put into practical use.

In particular, in a camera apparatus like a video camera, zoom lenses are generally used as the photographing lens, and the zoom ratio of such lenses has been increasing year-by-year.

Apart from this, a marked reduction in camera size has been achieved. As a result of the reduction in the size of the imaging plane, progress in the high-density mounting technique, the development of a small-sized recorder-mechanism chassis, etc., there has even appeared a small-sized camera apparatus which allows photographing with one hand.

However, such a small-sized video camera with a zoom lens has a problem in that it is subject to the generation of an undesirable image blur attributable to camera-shake during photographing.

Various anti-blurring means have been proposed in order to eliminate such a blur and obtain a stable image. Such anti-blurring means prove greatly effective not only in eliminating undesirable blur due to a shake of a hand-held camera but also in trying to mitigate an image blur in a situation in which camera-shake cannot be avoided even with a tripod, as in the case of photographing in a ship or an automobile.

Such an anti-blurring means includes at least a camera-movement detecting means for detecting a camera movement, and a blur correction means for compensating for any camera movement in accordance with the detected camera-movement information so as to prevent an image blur from appearing in the obtained image.

Known examples of the camera-movement detecting means include an angular acceleration meter, angular speed meter and angular displacement meter. As an example of the blur correction means, a method using a variable-apex prism is available. Further, in a video camera of the type in which an image area to be actually used as a picture plane is extracted from the entire image information obtained, a blur correction method can be used according to which the image-area extracting position is sequentially corrected in such a way as to compensate for any undesirable camera movement.

A blur correction means of the former type, in which any blur is removed by an optical means like a variable-apex prism at the stage in which the image is formed on the imaging device, will be referred to as an optical correction means, and a blur correction means of the latter type, in which blur is removed, for example, by electronically changing the extracting position of the image information containing the blur, will be referred to as an electronic correction means.

Generally speaking, an optical correction means is capable of correcting any blur within a fixed angle, determined as the blur angle, of a camera irrespective of the focal distance of the photographing lens. Accordingly, it can exhibit a blur eliminating property acceptable for practical use even when the telescope-end focal distance of the zoom lens is relatively long.

In an electronic correction means, in contrast, the correcting ratio with respect, for example, to the vertical dimension of the picture plane, is constant. Accordingly, the blur eliminating effect deteriorates in proportion to the telescope-end focal distance of the zoom lens.

Next, an anti-blurring apparatus having a variable-apex prism will be described.

FIG. 6(A) illustrates the relationship between the focal distance of the photographic lens and the angle of movement of a camera in terms of the position of the subject in an image.

In the drawing, numeral 23 indicates the optical axis of the photographic lens of a camera CA when the camera is in a position as indicated by solid line 22. In this position, the camera substantially catches the central portion of the face of a person 21 constituting the subject. Assuming that the camera CA has moved (as a result of camera-shake) to a position as indicated by a two-dot chain line 24, the optical axis of the camera becomes that indicated by numeral 25.

FIGS. 6(B) and 6(C) show images and picture plane positions obtained when the camera CA is in positions 22 and 24, respectively. FIG. 6(B) shows the condition when the zoom lens is at the telescopic end, and FIG. 6(C) shows the condition when it is at the wide angle. Numeral 26 indicates the subject inside the picture plane; numerals 27 and 29 indicate the picture plane positions when the camera CA is in the position 22; and numerals 28 and 30 indicate the picture plane positions when the camera CA is in the position 24.

As is apparent from FIGS. 6(A) to 6(C), if the angle of camera movement a is the same, the resulting blur in the picture plane naturally becomes more undesirable in proportion to the focal distance of the photographic lens. Thus, an optical means using a variable-apex prism is especially effective when applied to a blur removing means to be combined with a photographic lens having a long telescopic focal length.

FIGS. 7(A) through 7(C) show the construction of a variable-apex prism. In the drawing, numerals 31 and 33 indicate transparent glass plates; and numeral 37 indicates a bellows section made of a material like polyethylene. A transparent liquid such as silicon oil is sealed in the space defined by the glass plates 31 and 33 and the bellows section 37.

In the condition shown in FIG. 7(B), the two glass plates 31 and 33 are parallel to each other, and the incident and outgoing angles of a light beam 35 incident on this variable-apex prism are equal to each other.

When, as shown in FIGS. 7(A) and 7(C), the variable-apex prism exhibits some angle, the light beam 35 is bent at an angle. Thus, when the camera is inclined or undergoes a vibration as a result of camera-shake or the like, the angle of the variable-apex prism (the apex angle) is controlled in such a way that the light beam transmitted therethrough is bent in correspondence with that inclination, etc., thereby removing any undesirable blur.

FIGS. 8(A) and 8(B) show the way such blur removal is effected. In the condition shown in FIG. 8(A), the variable-apex prism is in a parallel position and the head of the subject is on the optical axis of the camera. If, as shown in FIG. 8(B), a camera movement occurs at an angle of a, the variable-apex prism is driven so as to bend the light beam, with the result that the photographing optical axis of the camera remains the same, and the head of the subject continues to be on the optical axis.

FIG. 9 schematically shows an example of an anti-vibration device which includes a variable-apex prism as described above, an actuator section for driving the prism, and an apex angle sensor for detecting the angular condition of the camera.

Since an actual image blur can occur in any direction, the front and rear glass planes of the variable-apex prism are rotatable on axes which are 90° deviated from each other, as shown in FIG. 9. The components belonging to the front and rear glass planes of the prism will be indicated by suffixes a and b, respectively, attached to the reference numerals, the components indicated by the same numerals having the same functions. For clarity, some of the components to be indicated by numerals with the suffix b are not shown.

Numerals 31 and 33 indicate glass plates, and numeral 37 indicates a bellows section made of polyethylene or the like.

Numeral 51 indicates a VAP (variable-apex prism), which includes the glass plates 31 and 33, the bellows section 37, etc. A transparent liquid such as silicon oil is sealed in the inner space defined by the glass plates 31 and 33 and the bellows section 37.

Numeral 38 (38a, 38b) indicates a frame to which the glass plate 31, 33 is integrally joined by adhesive or the like.

The frame 38 forms a rotation axis 43a, 43b together with a stationary member (not shown) and is rotatable on this axis. The dimension of the rotation axis 43a is 90° deviated from the dimension of the rotation axis 43b. A coil 45 (45b is not shown) is integrally provided on the frame 38, and magnets 46 and yokes 47 and 48 are provided in a stationary section (not shown).

By passing electric current through the coil 45, the glass plate 31, 33 of the variable-apex prism rotates around the axis 43. A slit 39 (39b is not shown) is provided at the tip of an arm 40 (40b is not shown) integrally extending from the frame 38, and constitutes an apex angle sensor between a light emitting device 41 (41b is not shown) like an iRED, and a light receiving device 52 (52b is not shown) like a PSD, which devices are provided in stationary sections.

FIG. 10 is a block diagram showing an anti-vibration lens system in which an anti-vibration means having the above-described variable-apex prism serving as an anti-blurring means is combined with a photographic lens.

In the drawing, numeral 51 indicates a variable-apex prism; numerals 53 and 54 indicate apex angle sensors; numeral 62 indicates an image sensor; numerals 63 and 64 indicate detection circuit sections for amplifying the outputs of the apex angle sensors 53 and 54; numeral 55 indicates a microcomputer; and numerals 56 and 57 indicate camera-movement detection means. The microcomputer 55 decides on the electric current to be supplied to actuators 58 and 59 so as to control the angle of the variable-apex prism 51 on the basis of the angle information detected by the apex angle sensors 53 and 54 and the detection results obtained by the camera-movement detection means 56 and 57, thereby setting the prism 51 at an optimum angle to remove any blur.

In the example Shown, the principal components are built in two blocks on the assumption that the glass plates 31 and 33, the rotation axes of which are 90° deviated from each other, are individually controlled.

When the variable-apex prism is used as a correction means, the following equation holds true within a range in which the apex angle is relatively small:

$$\epsilon = (n-1)\sigma \quad (1)$$

where n is the refractive index of the variable-apex prism; $\sigma$ is the prism apex angle; and $\epsilon$ is the angle (the correction angle) between the incident and outgoing angles of the light beam. For example, when n=1.4, inclining the variable-apex prism by 5° results in the light beam being bent by 2°.

In the above conventional example, blur correction is effected by independently rotating the two glass plates. When, for example, the rotation axes of the two glass plates are horizontal and vertical, respectively, and the same maximum rotation angle is imparted to them, the maximum correction amount obtained along a dimension extending obliquely on the picture plane is larger than the maximum correction amount obtained along the horizontal or vertical dimension.

Thus, it has been necessary to set the variable-apex prism at a large angle beforehand, taking this difference in maximum correction angle into consideration.

Here, the difference in maximum correction angle between the dimension of a rotation axis and a dimension different from that will be explained with reference to FIGS. 2(A) and 2(B) and FIGS. 3(A) and 3(B).

In the drawings, numeral 31 indicates the front glass plate of a (VAP) variable-apex prism 1 rotatable around a rotation axis Y, and numeral 33 indicates the rear glass plate thereof rotatable around a rotation axis Z.

Suppose the glass plate 33 has been rotated in the yaw direction by an angle $\theta y$ in order to compensate for a camera movement occurring along a dimension at an angle $\emptyset$ with respect to the rotation axis Y, as shown in FIG. 2(A).

As shown in FIG. 2(B), the section taken at the angle $\emptyset$ and passing the center of the VAP 1 has a V-shaped configuration, and the apex angle of this section will be indicated by $\theta'$.

Further, suppose, as shown in FIG. 2(A), the glass plate 31 has been inclined by $\theta p$ around the Y-axis. Assuming that the inclination of this glass plate at the angle $\emptyset$ is $\theta_1'$, then as shown in FIG. 3(A), $$\tan \theta_1' = \sin \emptyset \cdot \tan \theta p \quad (2)$$

Similarly, when, as shown in FIG. 2(B), the glass plate 33 has been inclined by $\theta y$ around the axis Z, then as shown in FIG. 3(B), $$\tan \theta_2' = \cos \emptyset \cdot \tan \theta y \quad (3)$$

Accordingly, in the case of FIG. 2, the angle $\theta'$ can be obtained from the following formula:

$$\begin{aligned}\theta_1' &= \theta_1' + \theta_2' \\ &= \tan^{-1}(\sin \phi \times \tan \theta p) + \tan^{-1}(\cos \phi \times \tan \theta y)\end{aligned} \quad (4)$$

Thus, $\theta$ is larger than $\theta p$ or $\theta y$.

When the maximum blur correction angle required by the VAP1 is defined as $\epsilon max$, this maximum correction angle is in the following relationship with the rotation angles $\theta pmax$ and $\theta ymax$, as shown in equation (1):

$$\epsilon max = (n-1) \cdot \theta pmax \quad (5)$$

$$\epsilon_{max} = (n-1) \cdot \theta_{ymax} \quad (6)$$

Accordingly, the rotation angles θy and θp are to be controlled within the following ranges:

$$-\theta_{yamx} \leq \theta_y \leq \theta_{ymax} \quad (7)$$

$$-\theta_{pamx} \leq \theta_p \leq \theta_{pmax} \quad (8)$$

However, as stated above, the prism apex angle θ when compensating for a camera movement occurring along a dimension different from those of the rotation axes is larger than the rotation angle θp or θy, so that the prism apex angle θmax' when both the rotation angles around the rotation axes are the maximum rotation angles θpmax and θymax (which is the case when correcting, as much as possible, a blur occurring along a dimension obliquely extending on the picture plane), is larger than the rotation angle θpmax or θymax. Assuming that the maximum blur correction amount at this time is εmax', $$\epsilon_{max}' = (n-1) \cdot \theta_{max}' \quad (9)$$

Accordingly, the maximum blur correction angle εmax' obtained along a dimension diagonally extending on the picture plane is larger than the initially determined maximum blur correction angle εmax along the horizontal/vertical picture dimensions.

Thus, the above conventional device has a problem in that the diameter of the variable-apex prism usually has to be large enough to be the size required when correcting a blur occurring along a dimension extending diagonally on the picture plane, with the result that it is a diameter larger than the one required in the blur correction along rotation axes.

Further, transverse chromatic aberration due to the variable-apex prism also increases in proportion to the blur angle, so that chromatic aberration in the periphery of the picture plane increases when a blur occurring along a direction extending diagonally on the picture plane is corrected.

SUMMARY OF THE INVENTION

It is an object of the present invention to provide a small-sized anti-vibration device which controls the amount of rotation of transparent optical members, constituting a variable-apex prism, in accordance with the dimension along which a blur occurs, in such a way as to prevent the maximum correction amount obtained along a dimension different from the dimensions of the rotation axes from becoming excessively large, thereby correcting any image blur to provide an image of satisfactory optical property.

In accordance with the present invention, there is provided an anti-vibration device having a variable-apex prism which is composed of two transparent optical members and an optically transparent substance sealed in the space defined between the two optical members, wherein the two optical members of the variable-apex prism are rotated by rotating means around rotation axes orthogonal to each other in accordance with information from a camera-movement detecting means, and wherein when correcting any blur by deflecting a transmitted luminous flux, the maximum blur correction angle $\epsilon_{max}$ to be obtained along the dimensions of the rotation axes is set beforehand, and the rotation amounts of the two optical members are restricted in such a way that the maximum blur correction angle with respect to a blur occurring along a dimension different from the dimensions of the rotation axes is substantially the same as the above-mentioned maximum correction angle $\epsilon_{max}$.

In particular, when the angle of the above-mentioned blur occurring along a dimension different from those of the rotation axes with respect to the rotation axis of the front optical member of the two optical members of the variable-apex prism, is Ø, and the respective maximum rotation angles of the front and rear optical members are $\theta_{pmax}$ and $\theta_{ymax}$, the following conditions are satisfied:

$$\theta_{pmax} = \epsilon_{max} \sin \emptyset/(n-1) \quad (10)$$

$$\theta_{ymax} = \epsilon_{max} \cos \emptyset/(n-1) \quad (11)$$

where n is the refractive index of the substance inside the variable-apex prism. Further, the above-mentioned camera-movement detecting means detects blur information from displacement amounts along the two dimensions orthogonal to each other, the two orthogonal dimensions being different from the dimensions along which the rotation axes of the optical members extend.

Further, in accordance with the present invention, there is provided an anti-vibration device having a variable-apex prism which is composed of two transparent optical members and an optically transparent substance sealed in the space defined between the two optical members, wherein the two optical members of the variable-apex prism are rotated by rotating means around rotation axes orthogonal to each other in accordance with information from a camera-movement detecting means, wherein when correcting any blur by deflecting a transmitted luminous flux, rotation angle ranges for the two optical members are respectively determined beforehand in accordance with their sizes, and their rotation angles are controlled in such a way that they are within their respective rotation angle ranges, and wherein when the respective rotation angles of the two optical members of the variable-apex prism are $\theta_p$ and $\theta_y$, and the maximum rotation angle (the apex angle) of the optical members is $\theta_{max}$, the following condition is satisfied:

$$\theta_p^2 + \theta_y^2 \leq \theta_{max}^2 \quad (12)$$

BRIEF DESCRIPTION OF THE DRAWINGS

FIG. 2, comprising

FIG. 3, comprising

FIG. 4 is a block diagram showing essential parts of a device according to a second embodiment of the present invention;

FIGS. 7(A) through 7(C) are diagrams illustrating the relationship between a prism apex angle and a transmitted luminous flux;

FIGS. 8(A) and 8(B) are schematic diagrams illustrating a case in which a variable-apex prism is arranged in front of a camera;

DETAILED DESCRIPTION OF THE PREFERRED EMBODIMENTS

Figure 1:
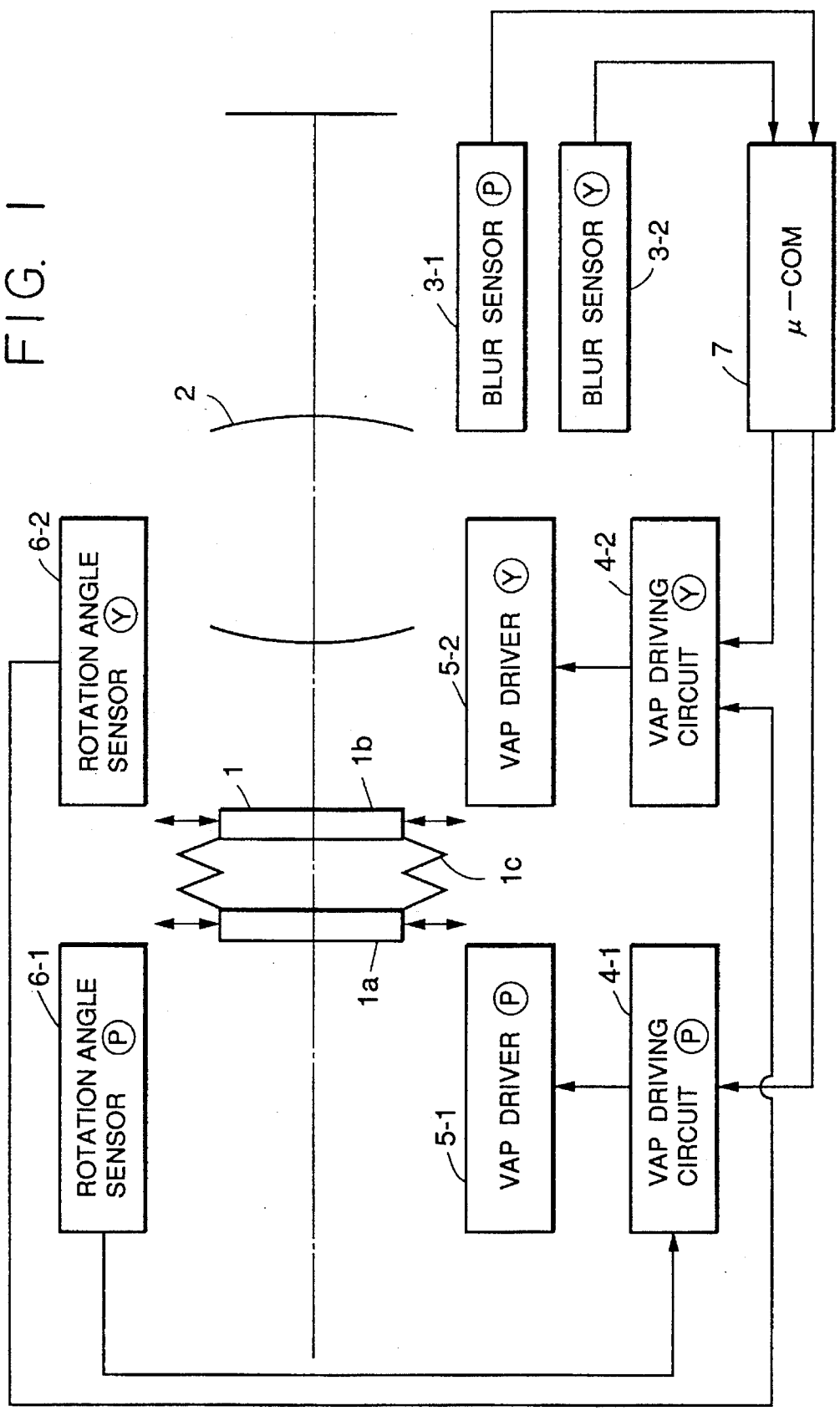
FIG. 1 is a block diagram showing essential parts of a device according to a first embodiment of the present invention.
Figure 2A:
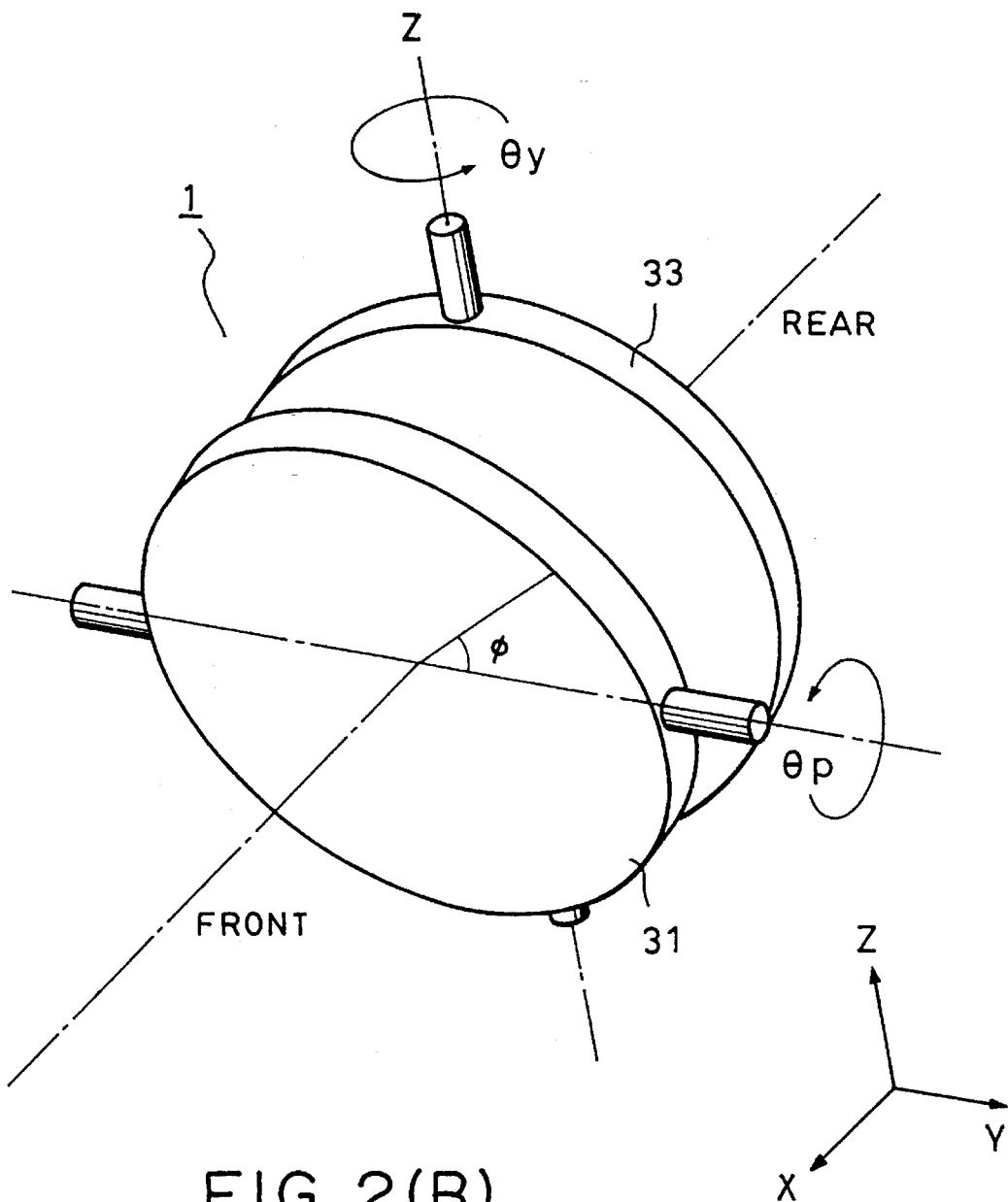
FIGS. 2(A) and 2(B), is a diagram illustrating a difference in maximum correction amount between the dimension of a rotation axis and a dimension different therefrom in a variable-apex prism.
Figure 2B:
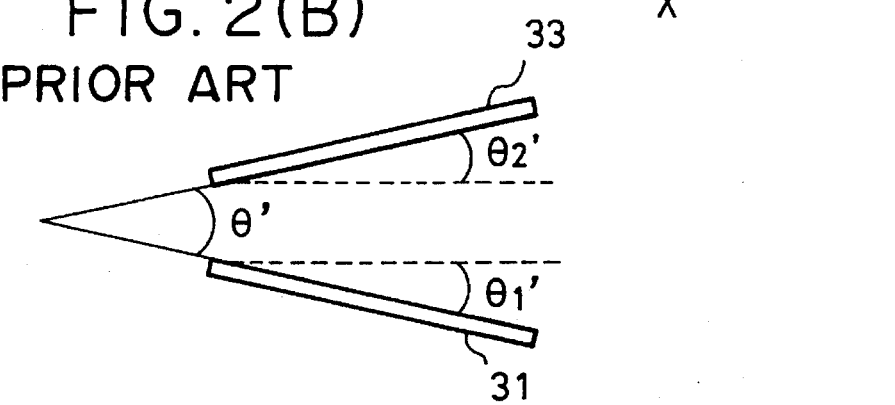
Figure 3A:
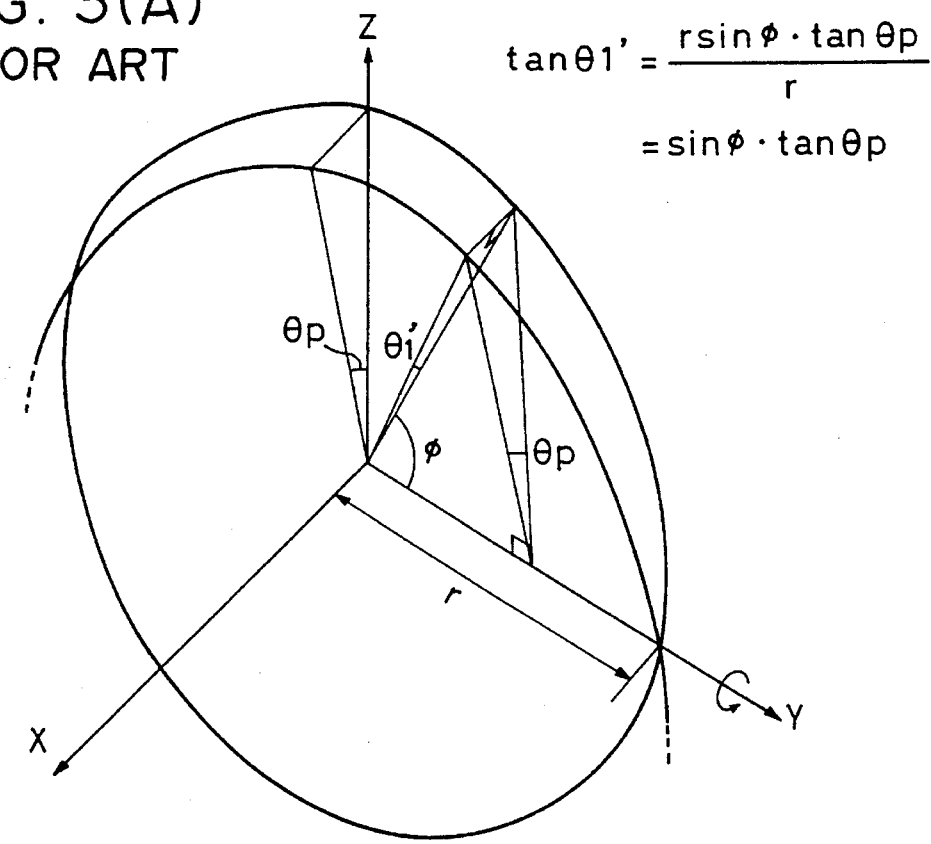
FIGS. 3(A) and 3(B), is a diagram illustrating a difference in maximum correction amount between the dimension of either rotation axis and a dimension different therefrom in a variable-apex prism.
Figure 3B:
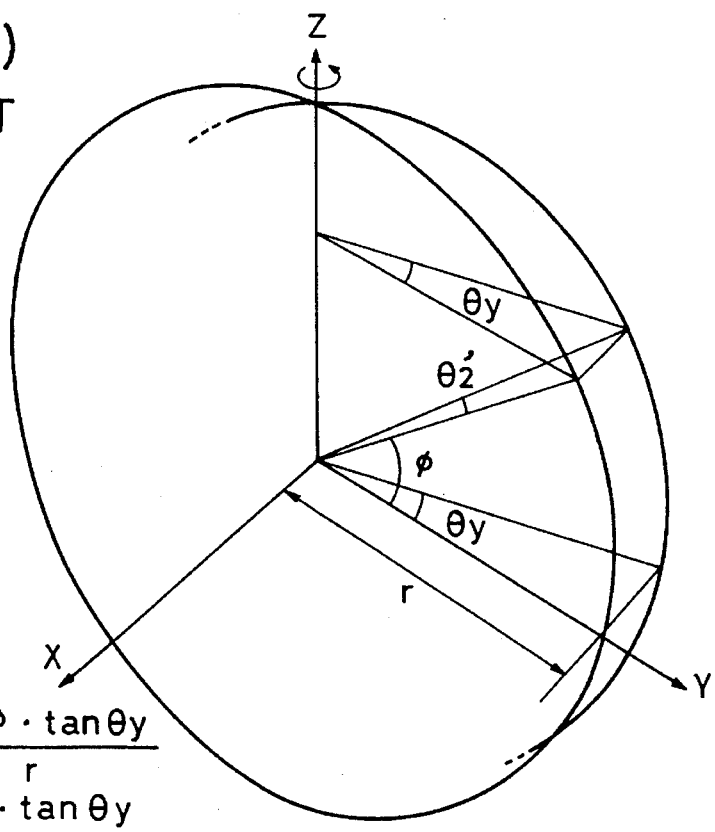

FIG. 1 is a schematic diagram showing essential parts of a device according to the first embodiment of the present invention as applied to an optical apparatus such as a single-lens reflex camera or a video camera.

In the drawing, numeral 1 indicates a VAP (variable-apex prism), which includes glass plates (transparent optical members) 1a and 1b and a bellows section 1c, a transparent liquid such as silicon oil being sealed in the inner space defined by the glass plates 1a and 1b and the bellows section 1c. Numeral 2 indicates a photographic lens.

Numerals 3-1 and 3-2 indicate blur sensors (camera-movement detecting means) for detecting any blur occurring along the vertical and horizontal dimensions, respectively. Numerals 6-1 and 6-2 indicate rotation angle sensors for detecting the rotation angles of the glass plates 1a and 1b, respectively.

Numeral 4(4-1, 4-2) indicates VAP driving circuits; and numeral 5(5-1, 5-2) indicates VAP drivers. The VAP driving circuits 4 cause the glass plates 1a and 1b to rotate by requisite amounts through the VAP drivers 5 in accordance with blur signals from a microcomputer 7 while monitoring the outputs from the rotation angle sensors 6, whereby an incident luminous flux is deflected by the requisite amount to introduce light to the photographic lens 2, thereby providing a vibration-proof effect.

In this embodiment, any camera movement detected by the blur sensors 3 is processed by the microcomputer 7 so as to be converted into blur angles εp and εy.

Then, in accordance with the relationship:

$$\epsilon = (n-1)\cdot\theta, \quad (13)$$

the blur angles are replaced by the rotation angles θp and θy of the VAP, which rotation angles are restricted in such a way as to not exceed the maximum rotation angles $\theta p_{max}$ and $\theta y_{max}$.

Suppose the following equations hold true:

$$\theta_{max} = \epsilon max/(n-1) \quad (14)$$

$$\theta p_{max} = \theta_{max}\cdot\sin\emptyset = \epsilon max \sin\emptyset/(n-1) \quad (15)$$

$$y_{max} = \theta_{max}\cdot\cos\emptyset = \epsilon max \cos\emptyset/(n-1) \quad (16)$$

where εmax: maximum correction angle n: refractive index of the inner liquid n: $\theta_{max}$: maximum rotation angle of the VAP ∅: angle made by the direction along which blur occurs and the axis of rotation in the pitch direction (the Y-axis)

Then, the prism apex angle θ of the VAP 1 as taken at the above-mentioned angle ∅ can be obtained as follows:

$$\theta' = \tan^{-1}(\sin\emptyset\cdot\tan\theta p) = \tan^{-1}(\cos\emptyset\cdot\tan\theta y) \quad (17)$$

Assuming that $\theta p = \theta p_{max}$, $\theta_{max} = \theta y_{max}$, $$\theta_{max}' = \tan^{-1}\{\sin\emptyset\cdot\tan(\theta_{max}\cdot\sin\emptyset)\} + \tan^{-1}\{\cos\emptyset\cdot\tan(\theta_{max}\cdot\cos\emptyset)\} \quad (18)$$

Since $\theta_{max} < 1$, sin ∅, cos ∅ ≤ 1, $$\begin{aligned}\theta_{max}' &\approx \tan^{-1}(\theta_{max}\times\sin^2\phi) + \tan^{-1}(\theta_{max}\times\cos^2\phi) \\ &\approx \theta_{max}(\sin^2\phi + \cos^2\phi) \\ &\approx \theta_{max}\end{aligned} \quad (19)$$

Therefore, the microcomputer 7 controls the VAP driving circuits 4 in such a way as to satisfy the following conditions:

$$0 \leq \theta p \leq \theta_{max}\cdot\sin\emptyset \quad (20)$$

$$0 \leq \theta y \leq \theta_{max}\cdot\cos\emptyset \quad (21)$$

In correspondence with this control, the VAP driving circuits 4 drive the VAP 1 while monitoring the actual rotation angles by utilizing the rotation angle sensors 6.

By performing the control operations as described above, it is possible for the maximum correction angle $\theta_{max}$ to be substantially constant irrespective of the angle ∅ of the dimension along which the blur occurs, whereby the following advantages are obtained:

(1) Since no excessive correction is performed on a blur occurring along a dimension extending diagonally on the image plane, it is possible to make the VAP relatively small.

(2) For the same reason mentioned above, the prism apex angle is not excessively large, so that the maximum value of chromatic aberration is constant irrespective of the dimension along which the blur occurs, thereby preventing the chromatic aberration from becoming excessive even in the case of a blur occurring along a dimension extending diagonally on the image plane.

Although in the above embodiment the blur directions as detected by the blur sensors 3-1 and 3-2 were respectively agree with the pitch and yaw directions of the VAP driving circuits 4, this should not be construed restrictively. By detecting blur occurring along two dimensions orthogonal to each other, the coordinates and directions of any blur can be easily obtained, which can be applied to the present invention. This helps to increase the degree of freedom in the arrangement of the blur sensors, which is advantageous in constructing the device.

Figure 5:
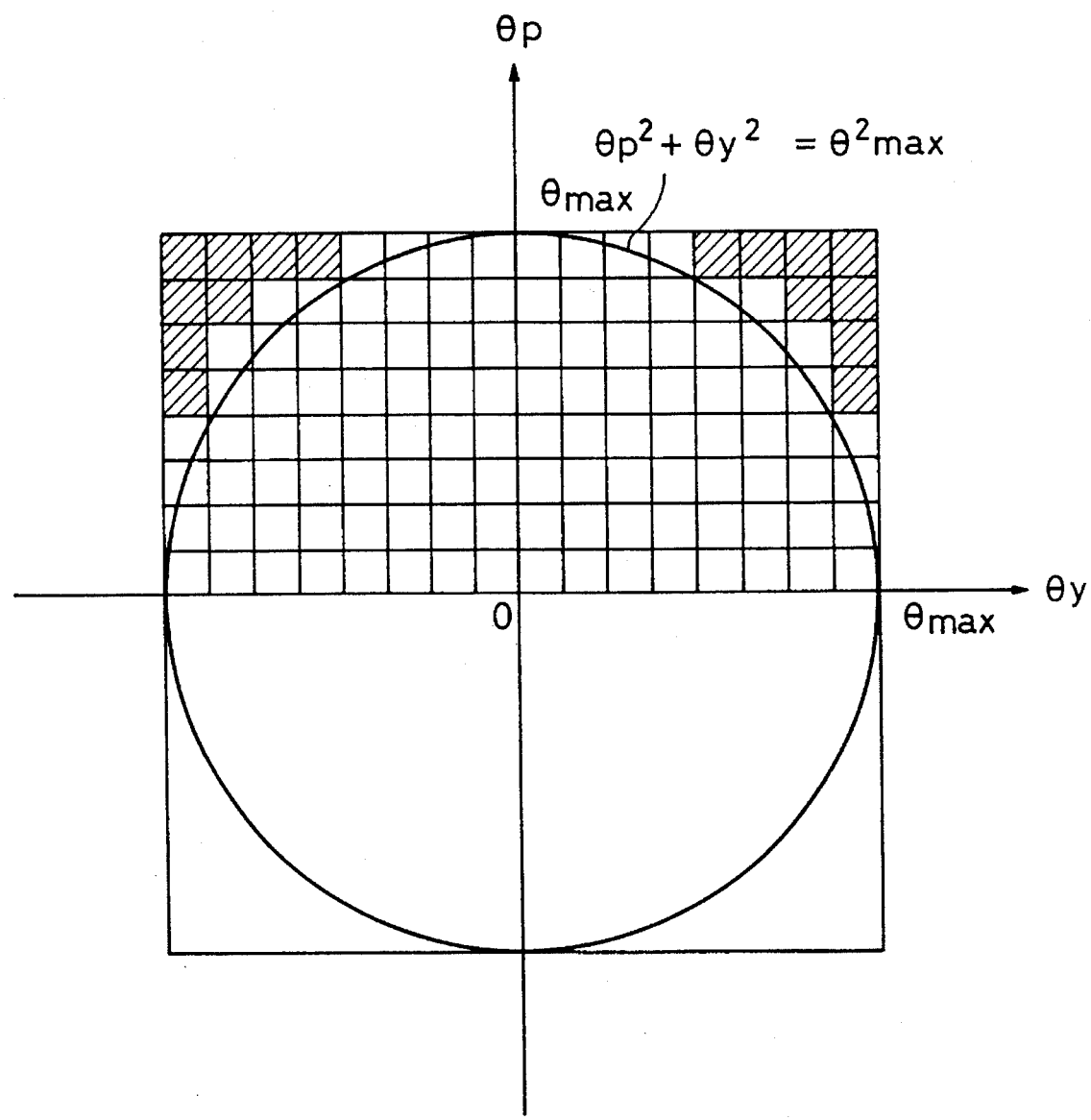
FIG. 5 is a diagram illustrating the second embodiment.
Figure 6A:
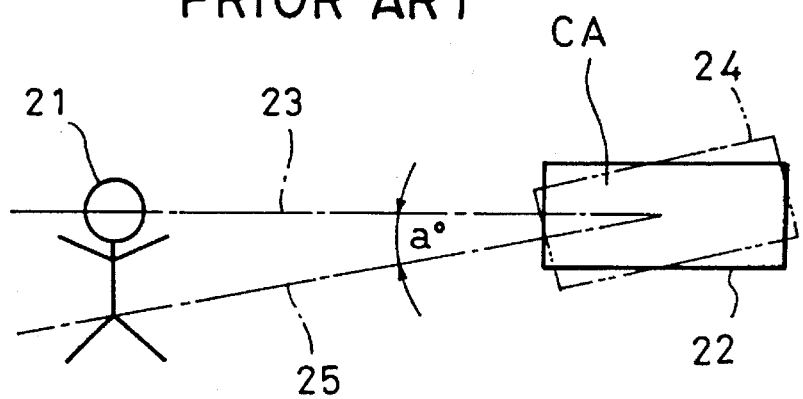
FIGS. 6(A) through 6(C) are diagrams illustrating the relationship between a camera-shake and an image blur.
Figure 6B:
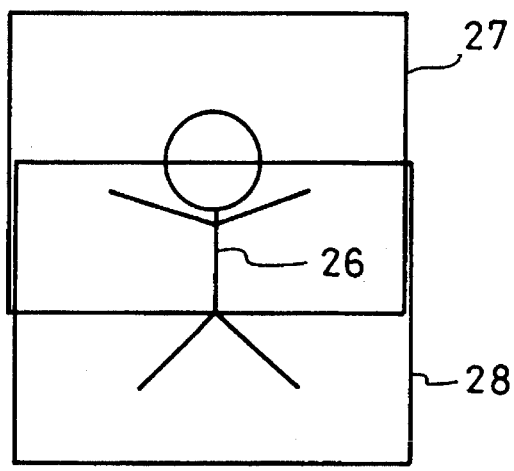
Figure 6C:
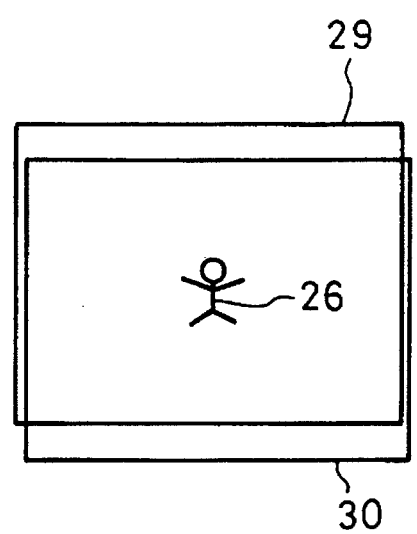
Figure 9:
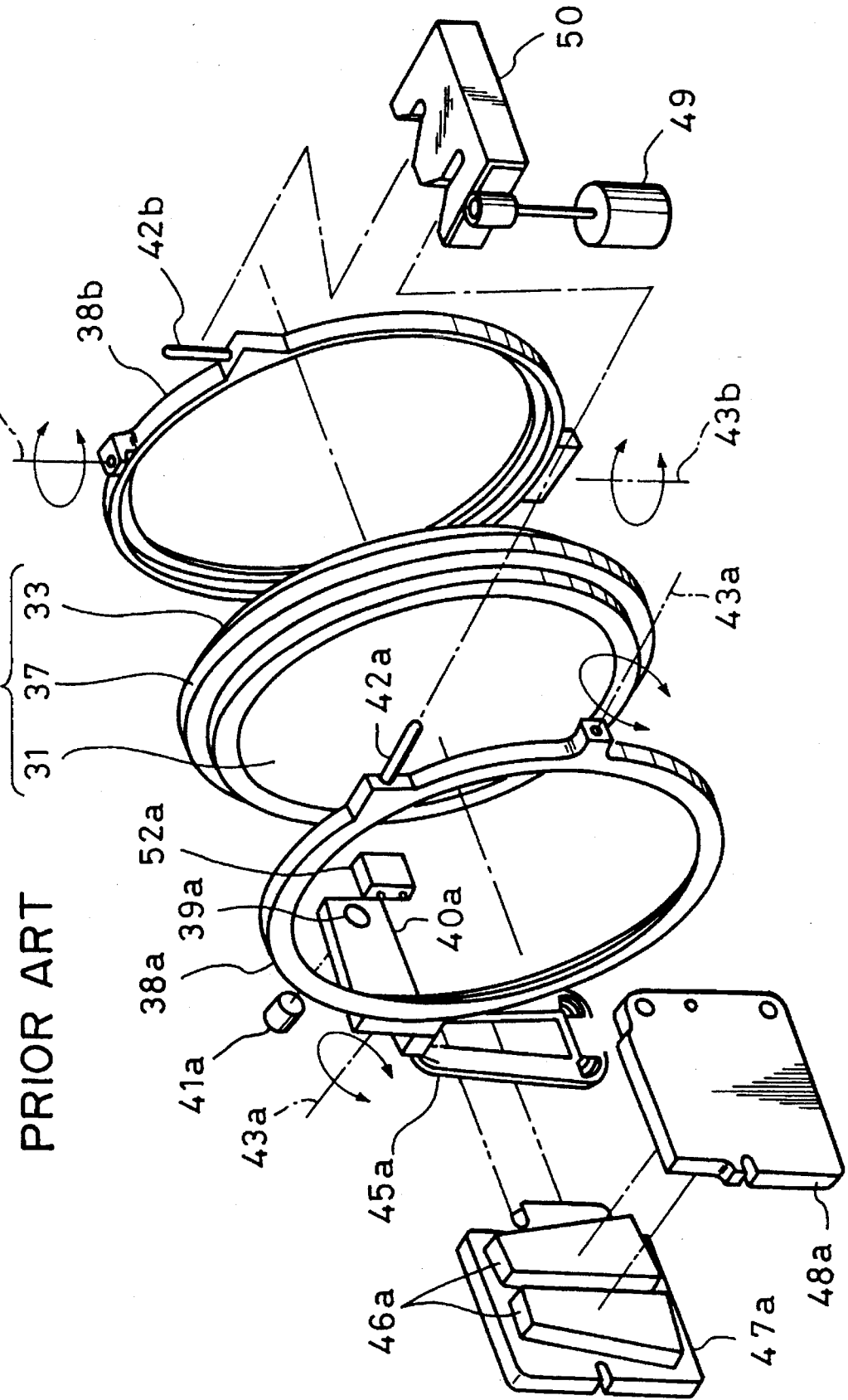
FIG. 9 is a schematic diagram showing essential parts of a conventional variable-apex prism device.
Figure 10:
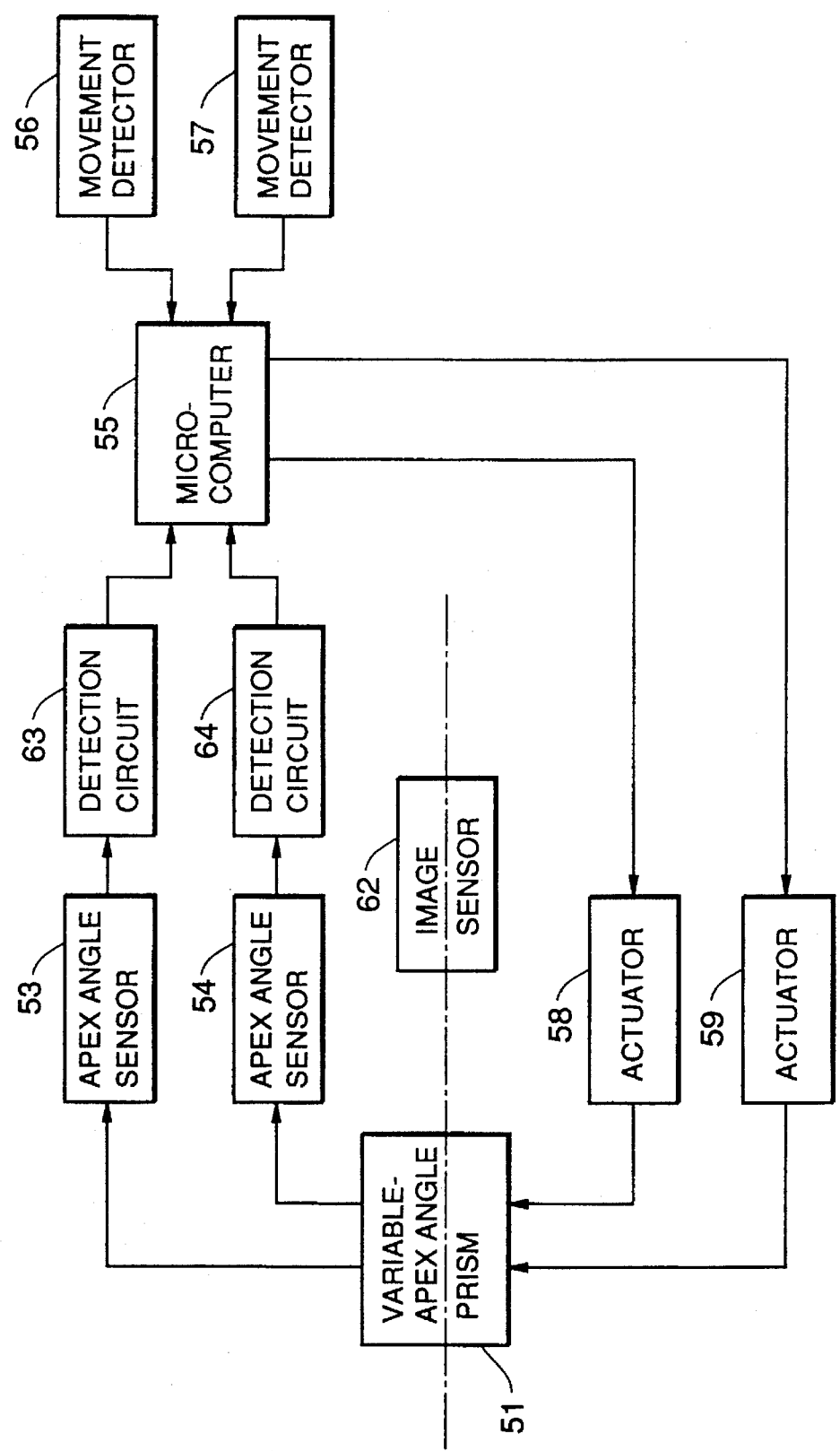
FIG. 10 is a block diagram showing an anti-vibration system using a variable-apex prism device.

FIG. 4 is a block diagram showing essential parts of a device according to the second embodiment of the present invention. FIG. 5 is a diagram illustrating the principle of the second embodiment. In the second embodiment, prohibition ranges are defined for the blur correction conducted by the microcomputer 7. Apart from this, it is the same as the first embodiment.

Referring to FIG. 5, the horizontal and vertical axes indicate the respective rotation angles θy and θp of the glass plates 1a and 1b, and the graph range is divided in a lattice-like manner, defining prohibition ranges in such a way that any correction amount obtained along a dimension different from the rotation axes is smaller than the correction amount obtained at the time of the maximum rotation of each glass plate. For example, the area inside a circle satisfying the condition:

$$\theta_p^2 + \theta_y^2 \leq \theta_{max}^2 \quad (22)$$

is defined as a permission range, and the areas outside this circle are defined as prohibition ranges (the shaded sections). Recorded data shown as range data 8 in FIG. 4 is used for control purposes. The microcomputer 7 obtains rotation angles θy and θp at a given point in time from the rotation angle sensors 6 (6-1, 6-2) and judges in which of the ranges of FIG. 5 they are located, controlling the angles in such a way that they remain within the permission range.

If they get in a prohibition range, they are quickly moved out of it on the basis of save data in that prohibition range. The save data may be data indicating the portion of the permission range closest to that prohibition range.

In accordance with the present invention, the rotation amounts of transparent optical members of a variable-apex prism are controlled in accordance with the dimension along which any blur occurs, in such a way as to prevent the maximum correction amount obtained along a dimension different from the rotation axes from becoming excessively large, thereby providing a small-sized anti-vibration device using a variable-apex prism which corrects any image blur to provide an image having satisfactory optical properties.

The individual components shown in outline or designated by blocks in the Drawings are well-known in the image recorded arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A variable-apex prism controller comprising:

a pair of transparent optical members;

driving means for driving said optical members around corresponding different rotation axes so as to change a direction of a light flux propagating through said optical members; and controlling means for controlling said driving means in such a way that the maximum light modification amount with respect to said rotation axes is substantially the same as the maximum light modification amount with respect to any direction different from direction of said rotation axes.

2. A variable-apex prism controller according to claim 1 which satisfies the following conditions:

$$\theta_{pmax} = \epsilon_{max} \sin \varnothing/(n-1)$$

$$\theta_{ymax} = \epsilon_{max} \cos \varnothing/(n-1)$$

where n is the refractive index of a substance inside the variable-apex prism; $\varnothing$ is the angle of a blur occurring along the direction different from said rotation axes with respect to the rotation axis of a first optical member of said pair of optical members; $\theta_{pmax}$ is the maximum rotation angle of the first optical member; $\theta_{ymax}$ is the maximum rotation angle of the second optical member; and $\epsilon_{max}$ is the maximum correction angle of the optical members.

3. A variable-apex prism controller according to claim 1, wherein said two rotation axes are orthogonal to each other.

4. A variable-apex prism controller according to claim 1, wherein assuming that the maximum rotation angle made by said pair of optical members is $\theta_{max}$, and the respective rotation angles of said optical members are $\theta_p$ and $\theta_y$, the following condition is satisfied:

$$\theta_p^2 + \theta_y^2 \leq \theta_{max}^2.$$

5. A variable-apex prism controller according to claim 1, wherein said controller is mounted on a device, and further comprising a detection means for detecting a shake of the device, said driving means being driven on the basis of a signal from said detection means and a control signal from said controlling means.

6. A variable-apex prism controller according to claim 2, wherein said driving means drives said optical members such that the following conditions are satisfied:

$$0 \leq \theta p \leq \theta_{max} \cdot \sin \varnothing$$

$$0 \leq \theta y \leq \theta_{max} \cdot \cos \varnothing$$

7. Apparatus for controlling first and second optical members which comprise a variable-apex prism, comprising:

a first driver for rotating the first optical member about a first axis;

a second driver for rotating the second optical member about a second axis substantially perpendicular to said first axis; and a controller for controlling said first and second drivers such that the following conditions are satisfied:

$$0 \leq \Theta p \leq \Theta_{max} \cdot \sin \varnothing$$

$$0 \leq \Theta y \leq \Theta_{max} \cdot \cos \varnothing$$

where $\Theta p$ is the rotation angle of said first optical member, $\Theta y$ is the rotation of angle of said second optical member, $\Theta_{max}$ is the maximum apex angle along directions parallel to the first and second axes and along any directions with respect to the first and second axes, and $\varnothing$ is the angle of blur occurring along a direction different from the first axis.

8. Apparatus according to claim 7, further comprising blur detecting means for detecting an apparatus shake, and for providing a shake signal to said controller, said controller controlling said first and second drivers in accordance with said shake signal.

9. Apparatus according to claim 8, wherein said blur detecting means comprises first and second blur sensors for respectively detecting apparatus shake in first and second perpendicular directions.

10. Apparatus according to claim 7, further comprising first and second rotation angle sensors for respectively detecting rotation angles of said first and second optical members, said controller controlling said first and second drivers in accordance with the rotation angles detected by said first and second rotation angle sensors.

11. Apparatus according to claim 7, wherein said controller controls said first and second drivers such that the following condition is satisfied:

$$\theta_p^2 + \theta_y^2 \leq \theta_{max}^2.$$

12. Apparatus according to claim 7, further comprising a camera coupled to said first and second drivers and having an objective lens disposed adjacent said variable-apex prism.

13. Apparatus according to claim 12 further comprising first and second camera shake detectors for detecting a shake of said camera, and wherein said controller controls said first and second drivers in accordance with the detected shake of said camera.

14. Apparatus for controlling a variable-apex prism which has a first transparent member rotating about a first axis, a second transparent member rotating about a second axis different from the first axis, and a transparent viscous medium disposed between the first and second transparent members, said apparatus comprising:

a first driver for rotating the first transparent member about the first axis by an angle of $\Theta p$;

a second driver for rotating the second transparent member about the second axis by an angle of $\Theta y$; and a controller for controlling said first and second drivers such that the following condition is satisfied;

$$\Theta_p^2 + \Theta_y^2 \leq \Theta_{max}^2$$

where $\Theta_{max}$ is the maximum apex angle along directions parallel to the first and second axes and along any directions with respect to the first and second axes.

15. Apparatus according to claim 14 further comprising shake detection means for detecting a shake of said apparatus, said controller controlling said first and second drivers in accordance with the detected shake.

16. Apparatus according to claim 15, wherein said shake detection means comprises first and second shake detectors for respectively detecting shake with respect to first and second orthogonal directions.

17. Apparatus according to claim 16, further comprising a camera coupled to said first and second drivers, and having an objective lens disposed adjacent said variable-apex prism, said first and second shake detectors comprising a camera shake detector.

18. Apparatus according to claim 14, further comprising first and second rotation angle sensors for respectively detecting the angles of rotation of said first and second transparent members about their corresponding first and second axes.

* * * * *

UNITED STATES PATENT AND TRADEMARK OFFICE
CERTIFICATE OF CORRECTION

PATENT NO. : 5,481,394
DATED : January 2, 1996
INVENTOR(S) : Kenichi Kimura

It is certified that error appears in the above-indentified patent and that said Letters Patent is hereby corrected as shown below: On the title page:

At [56] Foreign Patent Documents

Insert: --3-94215  4/1991 Japan--.

Column 2, line 59

"Fig. 7(B)," should read --Fig. 7(B),--.

Column 4

Line 1, "Shown," should read --shown,--.

Column 7

Line 55, "n: $\theta_{max}$:" should read --$\theta_{max}$:--.

Column 8

Line 1, "$\theta_{max}<1$," should read --$\theta_{max}\leq 1$,--.

UNITED STATES PATENT AND TRADEMARK OFFICE
CERTIFICATE OF CORRECTION

PATENT NO. : 5,481,394

DATED : January 2, 1996

INVENTOR(S) : Kenichi Kimura

It is certified that error appears in the above-indentified patent and that said Letters Patent is hereby corrected as shown below:

<u>Column 9</u>

Line 44, "direction" should read --directions--.
Line 45, "claim 1" should read --claim 1,--.

<u>Column 10</u>

Line 11, "$0 \leq \theta y \leq \theta_{max} \cdot \cos 0$" should read --$0 \leq \theta y \leq \theta_{max} \cdot \cos \phi$.--

<u>Column 11</u>

Line 5, "first and second drivers" should read --first driver and second driver--.

Line 6, "satisfied;" should read --satisfied:--.

Line 13, "claim 14" should read --claim 14,--.

Signed and Sealed this

Twenty-fifth Day of June, 1996

Attest:

BRUCE LEHMAN

*Attesting Officer*     *Commissioner of Patents and Trademarks*